United States Patent
Walters et al.

(10) Patent No.: US 7,445,044 B2
(45) Date of Patent: Nov. 4, 2008

(54) POLYMER MIXTURES FOR CROSSLINKED FLUIDS

(75) Inventors: Harold G. Walters, Duncan, OK (US);
Billy F. Slabaugh, Duncan, OK (US);
Jason Bryant, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/229,461

(22) Filed: Sep. 16, 2005

(65) Prior Publication Data

US 2007/0062703 A1 Mar. 22, 2007

(51) Int. Cl.
*E21B 43/27* (2006.01)
*E21B 43/26* (2006.01)

(52) U.S. Cl. .................. 166/300; 166/308.5; 166/305.1

(58) Field of Classification Search ........................ None
See application file for complete search history.

(56) References Cited

U.S. PATENT DOCUMENTS

| | | | | |
|---|---|---|---|---|
| 4,067,389 A | | 1/1978 | Savins | 166/246 |
| 4,647,312 A | * | 3/1987 | Sampath | 106/162.1 |
| 5,036,919 A | | 8/1991 | Thomas et al. | |
| 5,211,859 A | | 5/1993 | Horton et al. | |
| 5,271,466 A | | 12/1993 | Harms | |
| 5,322,123 A | * | 6/1994 | Kohler et al. | 166/295 |
| 5,325,921 A | | 7/1994 | Johnson et al. | |
| 5,591,691 A | | 1/1997 | Friedman et al. | |
| 5,591,699 A | | 1/1997 | Hodge | |
| 6,776,235 B1 | | 8/2004 | England et al. | |
| 7,134,497 B1 | * | 11/2006 | Chatterji et al. | 166/308.6 |
| 7,275,596 B2 | * | 10/2007 | Willberg et al. | 166/280.1 |
| 2005/0261138 A1 | | 11/2005 | Robb et al. | 507/209 |
| 2006/0054324 A1 | * | 3/2006 | Sullivan et al. | 166/308.1 |
| 2006/0144592 A1 | * | 7/2006 | Hanes et al. | 166/279 |
| 2006/0148658 A1 | * | 7/2006 | Hanes et al. | 507/209 |
| 2006/0151173 A1 | * | 7/2006 | Slabaugh et al. | 166/308.2 |
| 2006/0172893 A1 | * | 8/2006 | Todd et al. | 507/203 |
| 2006/0189709 A1 | * | 8/2006 | Fraser | 523/130 |
| 2006/0205606 A1 | | 9/2006 | Pauls et al. | 507/211 |
| 2006/0243449 A1 | | 11/2006 | Welton et al. | 166/307 |
| 2006/0247135 A1 | | 11/2006 | Welton et al. | 507/213 |
| 2007/0062702 A1 | | 3/2007 | Walters et al. | 166/300 |

FOREIGN PATENT DOCUMENTS

| | | | |
|---|---|---|---|
| EP | 0 146 981 A1 | 11/1984 | |
| EP | 0130732 A1 | 1/1985 | 43/22 |
| EP | 0 390 279 A1 | 3/1990 | |
| WO | WO 92/08038 | 5/1992 | |
| WO | WO 99/51701 | 10/1999 | |
| WO | WO 2006/079777 | 8/2006 | |

OTHER PUBLICATIONS

Liang Jin & Glenn S. Penny, "Dimensionless Methods for the Study of Particle Settling in Non-Newtonian Fluids," *Journal of Petroleum Technology,* SPE 28563, Mar. 1, 1995.
P.E. Clark, M. Halvaci, H. Ghaeli, & C.F. Parks, "Proppant Transport by Xanthan and Xanthan-Hydropropyl Guar Solutions: Alternatives to Crosslinked Fluids," SPE 13907, May 19, 1985.
International Search Report and Written Opinion for Patent Application No. PCT/GB2006/003360 mailed on Jan. 2, 2007 and filed on Dec. 9, 2006.
U.S. Appl. No. 11/077,881, Pauls et al.
U.S. Appl. No. 11/117,959, Welton et al.
U.S. Appl. No. 11/118,028, Welton et al.
U.S. Appl. No. 11/229,254, Walters et al.
Office Action dated Jul. 1, 2008 from U.S. Appl. No. 11/229,254.
"New Biopolymers for Drilling, Drill In, Completions, Spacer Fluids and Coiled Tubing", Navarrette et al., Proceedings from IADC/SPE Asia Pacific Drilling Tech, Conference Sep. 11, 2000.

* cited by examiner

*Primary Examiner*—Jennifer H Gay
*Assistant Examiner*—Angela M DiTrani
(74) *Attorney, Agent, or Firm*—Robert A. Kent; Baker Botts LLC

(57) ABSTRACT

Treatment fluids comprising gelling agents that comprise crosslinkable polymers and certain biopolymers, and methods of use in subterranean operations, are provided. In one embodiment, the present invention provides a method of treating a portion of a subterranean formation comprising: providing a treatment fluid that comprises an aqueous base fluid, a crosslinking agent, and a gelling agent comprising a polymer that is a crosslinkable polymer, and a polymer that is a biopolymer wherein a molecule of the biopolymer (1) consists only of glucose, or (2) has a backbone comprising one or more units that comprise at least (a) one glucose unit and (b) one linear or cyclic pyranose-type monosaccharide unit, wherein (a) and (b) have different molecular structures; and introducing the treatment fluid into a well bore penetrating the subterranean formation.

22 Claims, 2 Drawing Sheets

POLYMER MIXTURES FOR CROSSLINKED FLUIDS

CROSS-REFERENCE TO RELATED APPLICATIONS

The present invention is related to co-pending U.S. application Ser. No. 11/229,254 entitled "Polymer Mixtures for Crosslinked Fluids," filed concurrently herewith, the entire disclosure of which is incorporated herein by reference.

BACKGROUND

The present invention relates to methods and compositions for treating subterranean formations. More particularly, the present invention relates to treatment fluids comprising gelling agents that comprise crosslinkable polymers and certain biopolymers, and methods of use in subterranean operations.

Treatment fluids may be used in a variety of subterranean treatments, including, but not limited to, stimulation treatments and sand control treatments. As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the well bore. Once at least one fracture is created and the proppant particulates are substantially in place, the fracturing fluid may be "broken" (i.e., the viscosity of the fluid is reduced), and the fracturing fluid may be recovered from the formation.

Treatment fluids are also utilized in sand control treatments, such as gravel packing. In gravel-packing treatments, a treatment fluid suspends particulates (commonly referred to as "gravel particulates") to be deposited in a desired area in a well bore, e.g., near unconsolidated or weakly consolidated formation zones, to form a gravel pack to enhance sand control. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid may be reduced to allow it to be recovered. In some situations, fracturing and gravel-packing treatments are combined into a single treatment (commonly referred to as "frac pack" operations). In such "frac pack" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in these treatment fluids is important for a number of reasons. Maintaining sufficient viscosity is important in fracturing and sand control treatments for particulate transport and/or to create or enhance fracture width. Also, maintaining sufficient viscosity may be important to control and/or reduce fluid-loss into the formation. At the same time, while maintaining sufficient viscosity of the treatment fluid often is desirable, it may also be desirable to maintain the viscosity of the treatment fluid in such a way that the viscosity also may be easily reduced at a particular time, inter alia, for subsequent recovery of the fluid from the formation.

To provide the desired viscosity, polymeric gelling agents commonly are added to the treatment fluids. The term "gelling agent" is defined herein to include any substance that is capable of increasing the viscosity of a fluid, for example, by forming a gel. Examples of commonly used polymeric gelling agents include, but are not limited to, guar gums and derivatives thereof, cellulose derivatives, biopolymers, and the like. However, the use of a single gelling agent will necessarily limit the performance of the fluid to those properties that the single gelling agent used can impart to the treatment fluid, to the exclusion of other properties that other gelling agents might impart to the treatment fluid.

To further increase the viscosity of a treatment fluid, often the gelling agent is crosslinked with the use of a crosslinking agent. Conventional crosslinking agents usually comprise a metal ion that interacts with at least two gelling agent molecules to form a crosslink between them, thereby forming a "crosslinked gelling agent." Treatment fluids comprising crosslinked gelling agents also may exhibit elastic or viscoelastic properties, wherein the crosslinks between gelling agent molecules may be broken and reformed, allowing the viscosity of the fluid to vary with certain conditions such as temperature, pH, and the like. However, the use of such crosslinking agents may be problematic. For example, in some instances, the gelling agent molecules may "over-crosslink" in the presence of high concentrations of crosslinking agent, yielding a treatment fluid that is over-viscosified, difficult to break, exhibits syneresis (i.e., separation of liquid in a gel), or has other undesirable rheological properties.

Treatment fluids comprising mixtures of xanthan and a guar gum are known in the art. When compared to treatment fluids that contain a single polymer gelling agent, treatments fluids containing a mixture of xanthan and a guar gum may improve proppant transport capabilities of the treatment fluid. However, mixtures comprising xanthan and a guar gum have been found to be unstable at higher temperature conditions (e.g., greater than about 150° F.) in certain subterranean formations and well bores where treatment fluids comprising these mixtures may be useful.

SUMMARY

The present invention relates to methods and compositions for treating subterranean formations. More particularly, the present invention relates to treatment fluids comprising gelling agents that comprise crosslinkable polymers and certain biopolymers, and methods of use in subterranean operations.

In one embodiment, the present invention provides a method of treating a portion of a subterranean formation comprising: providing a treatment fluid that comprises an aqueous base fluid, a crosslinking agent, and a gelling agent comprising a polymer that is a crosslinkable polymer, and a polymer that is a biopolymer wherein a molecule of the biopolymer (1) consists only of glucose, or (2) has a backbone comprising one or more units that comprise at least (a) one glucose unit and (b) one linear or cyclic pyranose-type monosaccharide unit, wherein (a) and (b) have different molecular structures; and introducing the treatment fluid into a well bore penetrating the subterranean formation.

In another embodiment, the present invention provides a method of stimulating a portion of a subterranean formation comprising: providing a treatment fluid that comprises an aqueous base fluid, a crosslinking agent, and a gelling agent comprising a polymer that is a crosslinkable polymer, and a polymer that is a biopolymer wherein a molecule of the biopolymer (1) consists only of glucose, or (2) has a backbone comprising one or more units that comprise at least (a) one glucose unit and (b) one linear or cyclic pyranose-type monosaccharide unit, wherein (a) and (b) have different molecular structures; and contacting the subterranean formation with the treatment fluid at or above a pressure sufficient to create or enhance one or more fractures in a portion of the subterranean formation.

In another embodiment, the present invention provides a method of treating a portion of a subterranean formation comprising: providing a treatment fluid that comprises an aqueous base fluid, a crosslinking agent, and a gelling agent comprising a polymer that is a crosslinkable polymer, and diutan; and introducing the treatment fluid into a well bore penetrating the subterranean formation.

The features and advantages of the present invention will be readily apparent to those skilled in the art upon a reading of the description of the preferred embodiments that follows.

BRIEF DESCRIPTION OF THE DRAWINGS

These drawings illustrate certain aspects of some of the embodiments of the present invention and should not be used to limit or define the invention.

DESCRIPTION OF PREFERRED EMBODIMENTS

Figure 1A:
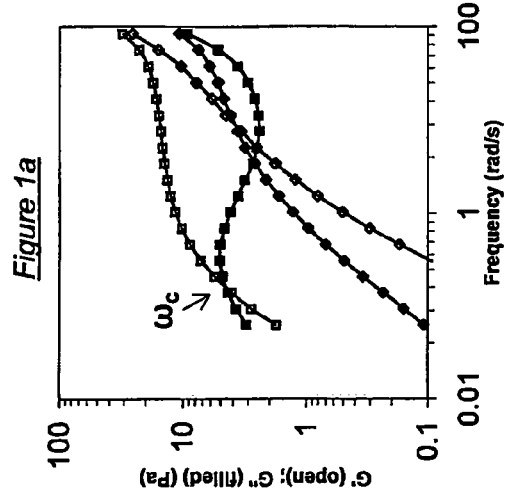
FIGS. 1a, 1b, 1c illustrate data regarding the viscoelastic properties of various treatment fluids, including certain embodiments of the treatment fluids of the present invention.

The present invention relates to methods and compositions for treating subterranean formations. More particularly, the present invention relates to treatment fluids comprising gelling agents that comprise crosslinkable polymers and certain biopolymers, and methods of use in subterranean operations.

The treatment fluids of the present invention generally comprise an aqueous base fluid, a gelling agent comprising certain biopolymers and a crosslinkable polymer, and a crosslinking agent. As used herein, the term "crosslinkable polymer" is defined to mean any polymeric material comprising at least two molecules that are capable of forming a crosslink in the presence of a suitable crosslinking agent. Among other things, the treatment fluids of the present invention may exhibit enhanced viscoelastic properties, such as low shear viscosity, and decreased levels of syneresis over other treatment fluids known in the art. These viscoelastic properties may enable, for example, slower proppant settling, improved proppant transport, and extended relaxation times in some treatment fluids the present invention.

The aqueous base fluid used in the treatment fluids of the present invention may comprise fresh water, saltwater (e.g., water containing one or more salts dissolved therein), brine (e.g., saturated saltwater), seawater, or combinations thereof. Generally, the water may be from any source, provided that it does not contain components that might adversely affect the stability and/or performance of the treatment fluids of the present invention. In certain embodiments, the density of the aqueous base fluid can be increased, among other purposes, to provide additional particle transport and suspension in the treatment fluids of the present invention. In certain embodiments, the pH of the aqueous base fluid may be adjusted (e.g., by a buffer or other pH adjusting agent), among other purposes, to facilitate hydration of the biopolymer, to activate a crosslinking agent, and/or to reduce the viscosity of the treatment fluid (e.g., activate a breaker, deactivate a crosslinking agent). In these embodiments, the pH may be adjusted to a specific level, which may depend on, among other factors, the types of biopolymers, crosslinking agents, and/or breakers included in the treatment fluid. One of ordinary skill in the art, with the benefit of this disclosure, will recognize when such density and/or pH adjustments are appropriate.

The gelling agent included in the treatment fluids of the present invention comprises certain biopolymers. The biopolymers utilized in the present invention have structures wherein a molecule of the biopolymer (1) consists only of glucose, or (2) has a backbone comprising one or more units that comprise at least (a) one glucose unit and (b) one linear or cyclic pyranose-type monosaccharide unit, wherein (a) and (b) have different molecular structures. The term "backbone," as used herein, refers to the longest sequence of units in the biopolymer molecule. Pyranose-type monosaccharides are generally characterized as having 5 carbon atoms and an oxygen atom in a ring of 6 atoms. In contrast to biopolymers that may be included in the treatment fluids already known in the art, the biopolymers utilized in the present invention do not comprise xanthan. Examples of suitable biopolymers include, but are not limited to, diutan, scleroglucan, succinoglycan, and combinations thereof and derivatives thereof. As used herein, the term "derivative" is defined to include any compound that is made from the base compound, for example, by replacing one atom in the base compound with another atom or group of atoms, ionizing one of the listed compounds, or creating a salt of one of the listed compounds. The biopolymers utilized in the present invention may or may not be crosslinked by one or more crosslinking agents. In certain embodiments of the present invention, the biopolymer may be provided in a concentrated aqueous solution prior to its combination with the other components necessary to form a treatment fluid of the present invention. In certain embodiments of the present invention, the biopolymer may be provided in a solution that comprises other components of the treatment fluid and/or the gelling agent (e.g., the crosslinkable polymer).

Generally, the biopolymer may be present in the treatment fluids of the present invention in an amount sufficient to provide the desired viscosity. In certain embodiments, the biopolymer may be present in an amount in the range of from about 0.01% to about 3% by weight of the treatment fluid ("bwof"). In certain exemplary embodiments, the biopolymer may be present in an amount in the range of from about 0.1% to about 1% bwof. In certain embodiments, the biopolymers may be present in the treatment fluids of the present invention in a biopolymer-to-crosslinkable polymer ratio in the range of from about 0.05:1 to about 1:1. In certain embodiments, the biopolymers may be present in the treatment fluids of the present invention in a biopolymer-to-crosslinkable polymer ratio of about 0.1:1. The biopolymer-to-crosslinkable polymer ratio is dependent on a variety of factors, such as the desired viscosity and/or elasticity, the particular application, downhole conditions, water quality, and the like, which will be recognizable by a person skilled in the art.

The gelling agent included in the treatment fluids of the present invention may comprise any suitable crosslinkable polymer, including, but not limited to, galactomannan gums, cellulose derivatives, combinations thereof, derivatives thereof, and the like. Galactomannan gums are generally characterized as having a linear mannan backbone with various amounts of galactose units attached thereto. Examples of suitable galactomannan gums include, but are not limited to, gum arabic, gum ghatti, gum karaya, tamarind gum, tragacanth gum, guar gum, locust bean gum, combinations thereof, derivatives thereof, and the like. Other suitable gums include, but are not limited to, hydroxyethylguar, hydroxypropylguar, carboxymethylguar, carboxymethylhydroxyethylguar and carboxymethylhydroxypropylguar. Examples of suitable cellulose derivatives include hydroxyethyl cellulose, carboxyethylcellulose, carboxymethylcellulose, and carboxymethylhydroxyethylcellulose; derivatives thereof, and combinations thereof. The crosslinkable polymers included in the treatment fluids of the present invention may be naturally-occurring, synthetic, or a combination thereof. The crosslinkable polymers may comprise hydratable polymers that contain one or more functional groups such as hydroxyl, cis-hydroxyl, carboxyl, sulfate, sulfonate, phosphate, phosphonate, amino, or amide groups. In certain embodiments, the crosslinkable polymers may be at least partially crosslinked, wherein at least a portion of the molecules of the crosslinkable polymers are crosslinked by a reaction comprising a crosslinking agent.

The crosslinkable polymers should be present in the treatment fluids of the present invention in an amount sufficient to provide the desired viscosity of the treatment fluid. In certain embodiments, the crosslinkable polymers may be present in an amount in the range of from about 0.05% to about 3% bwof. In certain embodiments, the crosslinkable polymers may be present in an amount in the range of from about 0.1% to about 1% bwof. In certain embodiments, the crosslinkable polymers may be present in a crosslinkable polymer-to-biopolymer ratio in the range of from about 1:1 to about 20:1. In certain embodiments, the crosslinkable polymers may be present in a crosslinkable polymer-to-biopolymer ratio of about 9:1. The crosslinkable polymer-to-biopolymer ratio is dependent on a variety of factors, such as the desired viscosity and/or elasticity, the particular application, downhole conditions, water quality, and the like, which will be recognizable by a person skilled in the art. In certain embodiments of the present invention, the crosslinkable polymers and/or biopolymers may be provided in a concentrated aqueous solution prior to its combination with the other components necessary to form a treatment fluid of the present invention. In certain embodiments of the present invention, the crosslinkable polymers may be provided in a solution that comprises other components of the treatment fluid and/or the gelling agent (e.g., the biopolymer).

Crosslinking agents are generally included in the treatment fluids of the present invention to crosslink at least a portion of the molecules of the crosslinkable polymers to form a crosslinked polymer. The term "crosslinking agent" is defined herein to include any molecule, atom, or ion that is capable of forming one or more crosslinks between molecules of the crosslinkable polymer and/or between one or more atoms in a single molecule of the crosslinkable polymer. The crosslinking agent in the treatment fluids of the present invention may comprise a metal ion that is capable of crosslinking at least two molecules of the crosslinkable polymer. Examples of suitable crosslinking agents include, but are not limited to, borate ions, zirconium IV ions, titanium IV ions, aluminum ions, antimony ions, chromium ions, iron ions, copper ions, and zinc ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. An example of a suitable commercially available compound capable of providing metal ions is "CL-24™" crosslinker available from Halliburton Energy Services, Inc., Duncan, Okla. In certain embodiments of the present invention, the crosslinking agent may be present in a crosslinked polymer, wherein at least a portion of the molecules of the crosslinkable polymer are crosslinked by the crosslinking agent.

In some embodiments, the crosslinking agent may comprise a delayed crosslinking agent, which may be formulated to form crosslinks between polymer molecules after a certain time or under certain conditions (e.g., temperature, pH, etc.). In some embodiments, the treatment fluid may comprise a crosslinking delaying agent, such as a polysaccharide crosslinking delaying agents derived from guar, guar derivatives, or cellulose derivatives. The crosslinking delaying agent may be included in the treatment fluid, inter alia, to delay crosslinking of the crosslinkable polymers until desired. One of ordinary skill in the art, with the benefit of this disclosure, will know the appropriate amount of the crosslinking delaying agent to include in the treatment fluids for a desired application.

Suitable crosslinking agents may be present in the treatment fluids of the present invention in an amount sufficient to provide, inter alia, the desired degree of crosslinking between molecules of the crosslinkable polymers. In certain embodiments, the crosslinking agent may be present in the treatment fluids of the present invention in an amount in the range of from about 10 parts per million ("ppm") to about 500 ppm by weight of the treatment fluid. In certain exemplary embodiments, the crosslinking agent may be present in the treatment fluids of the present invention in an amount in the range of from about 75 ppm to about 200 ppm by weight of the treatment fluid. One of ordinary skill in the art, with the benefit of this disclosure, will recognize the appropriate type and amount of crosslinking agent to include in a treatment fluid of the present invention based on, among other things, the temperature conditions of a particular application, the type of crosslinkable polymers used, the molecular weight of the crosslinkable polymers, and/or the pH of the treatment fluid.

The treatment fluids of the present invention optionally may comprise particulates, such as proppant particulates or gravel particulates. Particulates suitable for use in the present invention may comprise any material suitable for use in subterranean operations. Suitable materials for these particulates include, but are not limited to, sand, bauxite, ceramic materials, glass materials, polymer materials, TEFLON® (a polytetrafluoroethylene material) materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

The gelled or gelled and cross-linked treatment fluids may also include internal delayed gel breakers such as enzyme, oxidizing, acid buffer, or temperature-activated gel breakers. The gel breakers may cause the viscous treatment fluids to revert to thin fluids that can be produced back to the surface after they have been used to place proppant particles in subterranean fractures. In certain embodiments, the gel breaker used may be present in the treatment fluid in an amount in the range of from about 0.0001% to about 10% by weight of the gelling agent.

The treatment fluids of the present invention optionally may include one or more of a variety of well-known additives, such as gel stabilizers, fluid loss control additives, acids, corrosion inhibitors, catalysts, clay stabilizers, biocides, bactericides, friction reducers, gas, surfactants, solubilizers, pH adjusting agents, and the like. For example, in some embodiments, it may be desired to foam a treatment fluid of the present invention using a gas, such as air, nitrogen, or carbon dioxide. Those of ordinary skill in the art, with the benefit of this disclosure, will be able to determine the appropriate additives for a particular application.

The treatment fluids of the present invention may be prepared by any method suitable for a given application. For example, certain components of the treatment fluid of the present invention (e.g., crosslinkable polymers, biopolymers, etc.) may be provided in a pre-blended powder, which may be combined with the aqueous base fluid at a subsequent time. In preparing the treatment fluids of the present invention, the pH of the aqueous base fluid may be adjusted, among other purposes, to facilitate the hydration of the gelling agent. The pH range in which the gelling agent will readily hydrate may depend upon a variety of factors (e.g., the components of the gelling agent, etc.) that will be recognized by one skilled in the art. This adjustment of pH may occur prior to, during, or subsequent to the addition of the gelling agent and/or other components of the treatment fluids of the present invention. For example, the treatment fluids of the present invention may comprise an ester that releases an acid once placed downhole that is capable of, inter alia, reducing the pH and/or viscosity of the treatment fluid. After the preblended powders and the aqueous base fluid have been combined crosslinking agents and other suitable additives may be added prior to introduction into the well bore. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable treatments where a treatment fluid of the present invention may be suitable. In one embodiment, the present invention provides a method of treating a portion of a subterranean formation comprising: providing a treatment fluid that comprises an aqueous base fluid, crosslinking agent, and a gelling agent comprising a first polymer that is a crosslinkable polymer and a second polymer that is a biopolymer wherein a molecule of the biopolymer (1) consists only of glucose, or (2) has a backbone comprising one or more units that comprise at least (a) one glucose unit and (b) one linear or cyclic pyranose-type monosaccharide unit, wherein (a) and (b) have different molecular structures; and introducing the treatment fluid into a well bore penetrating the subterranean formation. Subsequent to the introduction of the treatment fluid into the well bore, the viscosity of the treatment fluid may be reduced at a desired time, and the reduced viscosity treatment fluid may be recovered and/or produced back through the well bore.

To facilitate a better understanding of the present invention, the following examples of certain aspects of some embodiments are given. In no way should the following examples be read to limit, or define, the scope of the invention.

EXAMPLES

As used in the Examples below, the unit "ppt" refers to pounds of dry ingredient per 1000 gallons of fluid.

Example 1

Samples of three treatment fluids of the following compositions were prepared in 400 mL jars: Sample Fluid 1 contained 45 ppt guar in a solution of 2% KCl by weight in tap water obtained in Duncan, Okla.; Sample Fluid 2 contained 40.5 ppt guar and 4.5 ppt xanthan in a solution of 2% KCl by weight in tap water obtained in Duncan, Okla.; and Sample Fluid 3 (a sample of a treatment fluid of the present invention) contained 40.5 ppt guar and 4.5 ppt diutan in a solution of 2% KCl by weight in tap water obtained in Duncan, Okla. 20/40 Brady sand was added to each sample in an amount of 3 pounds per gallon of fluid ("ppg"), and then each sample was heated in a water bath to 77° F. Once the samples reached that temperature, a predetermined amount (listed in Table 1 below) of a borate crosslinking agent was blended into each sample using a Waring blender for 30 seconds. Afterwards, the samples were returned to the water bath. Table 1 below lists the settle time (i.e., time at which 3 ppg sand completely settled in the jar) for each of the three samples.

A small-amplitude oscillatory shear ("SAOS") frequency sweep test was also performed on each of the sample fluids using a cylindrical couette fixture on a Stresstech rheometer (available from Rheologica Instruments), both before and after the fluid samples were crosslinked. In this test, a sinusoidal shear strain is applied to the sample in the form of $\gamma = \gamma_0 \sin \omega t$, where $\gamma_0$ is the strain amplitude and $\omega$ is the oscillation frequency. The shear stress response is $\sigma = G' \sin \omega t + G'' \cos \omega t$, where $G'$ is the storage modulus in phase with the applied shear strain and $G''$ is the loss modulus out of phase with the applied shear strain (or in phase with the applied shear-strain rate).

Figure 1B:
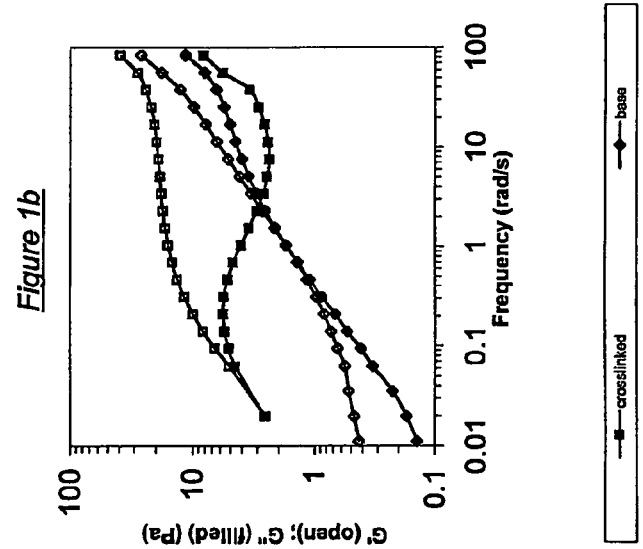
Figure 1C:
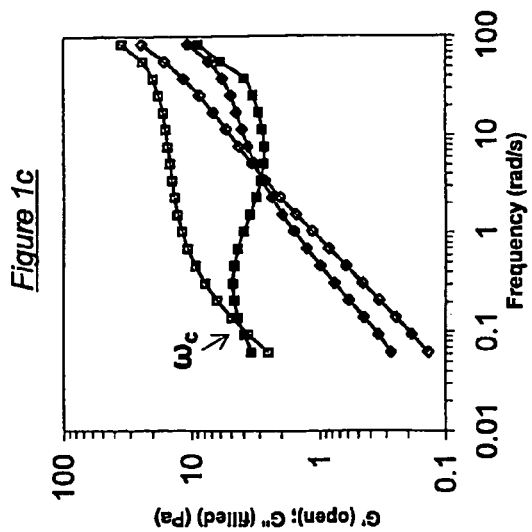

A plot of frequency versus storage modulus and loss modulus from the SAOS frequency sweep for the base and crosslinked fluids from each of the three samples is provided in FIGS. 1a, 1b and 1c, respectively. Table 1 below also lists the crossover frequency ($\omega_c$) (i.e., the frequency where $G'=G''$, the point where the elastic response of the fluid at high frequencies is separated from the viscous response at low frequencies, indicated on each figure) for the crosslinked fluid from each of the three samples. Lower crossover frequency values generally translate into higher relaxation times for a fluid, which indicates improved static suspension properties of the fluid.

TABLE 1

| | Amount of borate crosslinking agent (gallons per 1000 gal fluid ("gpt")) | Settle Time (hours) (approx.) | Crossover Frequency ($\omega_c$) (rad/s) |
|---|---|---|---|
| Sample Fluid 1 | 1 | 8 | 0.16 |
| Sample Fluid 2 | 1 | (suspended)[1] | — |
| Sample Fluid 3 | 1 | 12 | 0.11 |

[1] The sand in this Sample Fluid remained suspended and did not settle.

Example 2

Samples of three treatment fluids of the compositions described in Example 1 above were prepared in 400 mL jars. 20/40 Brady sand was added to each sample in an amount of 3 ppg, and then each sample was heated in a water bath to 150° F. Once the samples reached that temperature, a predetermined amount (listed in Table 2 below) of a borate crosslinking agent was blended into each sample using a Waring blender for 30 seconds. Afterwards, the samples were returned to the water bath. An SAOS frequency sweep test as described in Example 1 above was also performed on each of the samples. Table 2 below lists the settle time (i.e., time at which 3 ppg sand completely settled in the jar) and the crossover frequency ($\omega_c$) for each of the three samples.

TABLE 2

| | Amount of borate crosslinking agent (gpt) | Settle Time (hours) (approx.) | Crossover Frequency ($\omega_c$) (rad/s) |
|---|---|---|---|
| Sample Fluid 1 | 3.75 | 1 | 0.46 |
| Sample Fluid 2 | 4.25 | 1 | 0.90 |
| Sample Fluid 3 | 4.75 | 2 | 0.20 |

Example 3

Figure 2:
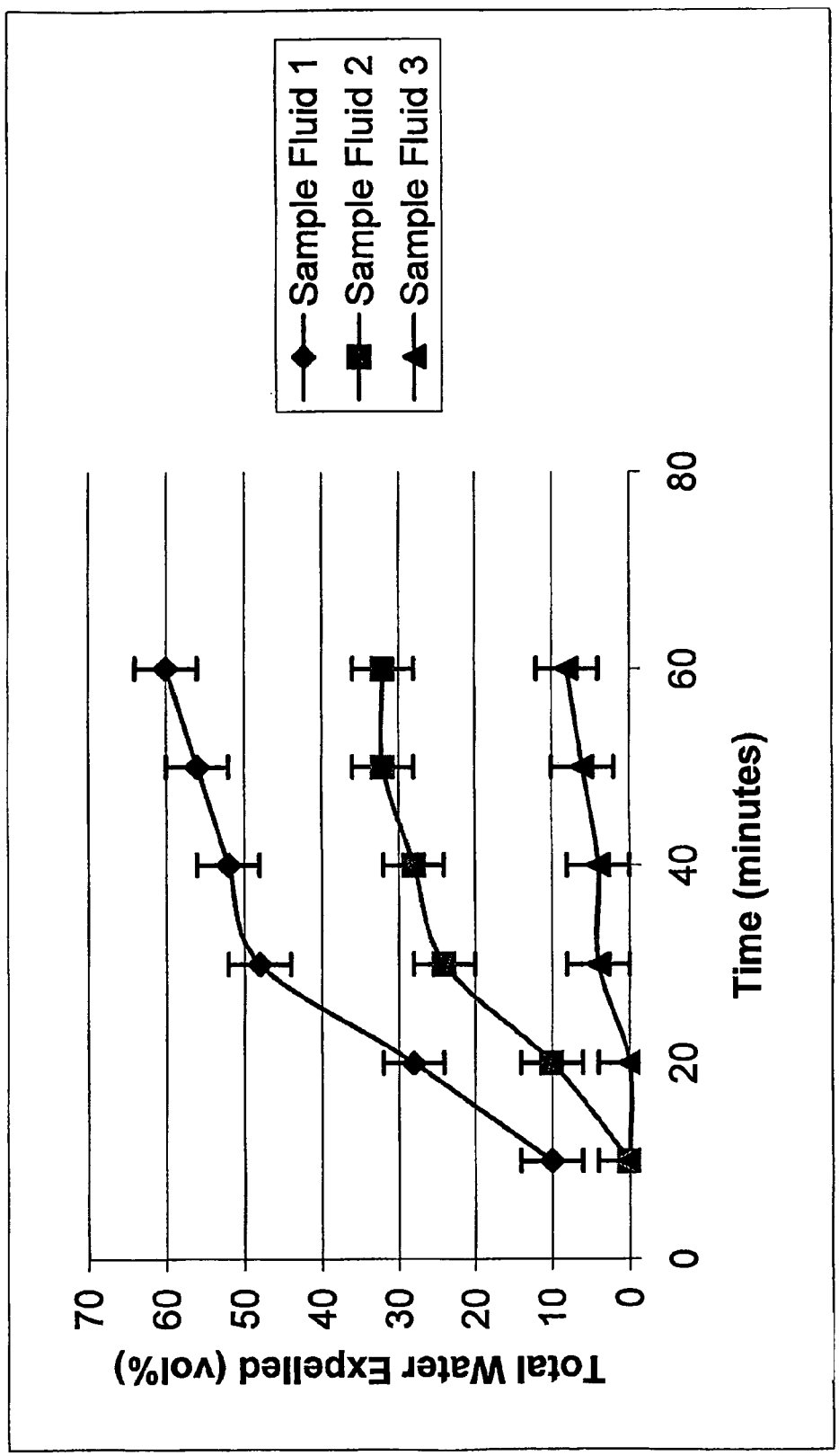
FIG. 2 illustrates data regarding other viscoelastic properties of various treatment fluids, including certain embodiments of the treatment fluids of the present invention.

Samples of three treatment fluids of the compositions described in Example 1 above were prepared in 400 mL jars. 20/40 Brady sand was added to each sample fluid in an amount of 3 ppg, and then each sample was heated in a water bath to 150° F. Once the samples reached that temperature, a borate crosslinking agent was blended into each sample in an amount of 5 gpt using a Waring blender for 30 seconds. Afterwards, the samples were returned to the water bath. The amount of solvent expelled from each fluid sample was recorded every 10 minutes over a period of one hour. These observations are listed in Table 3 below, and a plot time (min) versus total solvent expelled (vol %) is provided in FIG. 2.

TABLE 3

| | Total solvent expelled (vol %) | | |
|---|---|---|---|
| Time (min) | Sample Fluid 1 | Sample Fluid 2 | Sample Fluid 3 |
| 10 | 10 | 0 | 0 |
| 20 | 28 | 10 | 0 |
| 30 | 48 | 24 | 4 |
| 40 | 52 | 28 | 4 |
| 50 | 56 | 32 | 6 |
| 60 | 60 | 32 | 8 |

Thus Examples 1-3 illustrate that the treatment fluids of the present invention may exhibit enhanced rheological properties.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method of treating a portion of a subterranean formation comprising:
   providing a treatment fluid that comprises
      an aqueous base fluid,
      a crosslinking agent, and
      a gelling agent comprising
         a polymer that is a crosslinkable polymer, and
         a polymer that is a biopolymer that is not crosslinked by the crosslinking agent, wherein a molecule of the biopolymer
            (1) consists only of glucose, or
            (2) has a backbone comprising one or more units that comprise at least (a) one glucose unit and (b) one linear or cyclic pyranose-type monosaccharide unit, wherein (a) and (b) have different molecular structures; and introducing the treatment fluid into a well bore penetrating the subterranean formation.

2. The method of claim 1 wherein the biopolymer comprises at least one biopolymer selected from the group consisting of diutan, scleroglucan, succinoglycan, any derivative thereof, and any combination thereof.

3. The method of claim 1 wherein the crosslinkable polymer comprises at least one polymer selected from the group consisting of gum arabic, gum ghaffi, gum karaya, tamarind gum, tragacauth gum, guar gum, locust bean gum, cellulose, any derivative thereof, and any combination thereof.

4. The method of claim 1 wherein at least a portion of the molecules of the crosslinkable polymer are crosslinked by a reaction comprising the crosslinking agent.

5. The method of claim 1 wherein the crosslinking agent comprises at least one crosslinking agent selected from the group consisting of a borate ion, a zirconium IV ion, a titanium IV ion, an aluminum ion, an antimony ion, a chromium ion, an iron ion, a copper ion, a zinc ion, and any combination thereof.

6. The method of claim 1 wherein:
the treatment fluid further comprises particulates; and
the method further comprises depositing at least a portion of the particulates in or adjacent to a portion of the subterranean formation such that the particulates provide some degree of sand control in or adjacent to a portion of the subterranean formation.

7. The method of claim 1 further comprising adjusting the pH of the aqueous base fluid.

8. The method of claim 1 further comprising reducing the viscosity of the treatment fluid subsequent to the introduction of the treatment fluid into the well bore.

9. The method of claim 1 wherein the biopolymer is present in the treatment fluid in a biopolymer-to-crosslinkable polymer ratio in the range of from about 0.05:1 to about 1:1.

10. The method of claim 1 wherein the biopolymer is present in the treatment fluid in a biopolymer-to-crosslinkable polymer ratio of about 0.1:1.

11. A method of stimulating a portion of a subterranean formation comprising:
providing a treatment fluid that comprises
an aqueous base fluid,
a crosslinking agent, and
a gelling agent comprising
a polymer that is a crosslinkable polymer, and
a polymer that is a biopolymer that is not crosslinked by the crosslinking agent, wherein a molecule of the biopolymer
(1) consists only of glucose, or
(2) has a backbone comprising one or more units that comprise at least (a) one glucose unit and (b) one linear or cyclic pyranose-type monosaccharide unit, wherein (a) and (b) have different molecular structures; and contacting the subterranean formation with the treatment fluid at or above a pressure sufficient to create or enhance one or more fractures in a portion of the subterranean formation.

12. The method of claim 11 wherein the biopolymer comprises at least one biopolymer selected from the group consisting of diutan, scleroglucan, succinoglycan, derivatives thereof, and any combination thereof.

13. The method of claim 11 wherein the crosslinkable polymer comprises at least one polymer selected from the group consisting of gum arabic, gum ghatti, gum karaya, tamarind gum, tragacanth gum, guar gum, locust bean gum, cellulose, any derivative thereof, and any combination thereof.

14. The method of claim 11 wherein at least a portion of the molecules of the crosslinkable polymer are crosslinked by a reaction comprising the crosslinking agent.

15. The method of claim 11 further comprising reducing the viscosity of the treatment fluid subsequent to the contacting the subterranean formation with the treatment fluid.

16. The method of claim 11 further comprising adjusting the pH of the aqueous base fluid.

17. The method of claim 11 wherein the biopolymer is present in the treatment fluid in a biopolymer-to-crosslinkable polymer ratio in the range of from about 0.05:1 to about 1:1.

18. The method of claim 11 wherein the biopolymer is present in the treatment fluid in a biopolymer-to-crosslinkable polymer ratio of about 0.1:1.

19. A method of treating a portion of a subterranean formation comprising:
providing a treatment fluid that comprises
an aqueous base fluid,
a crosslinking agent, and
a gelling agent comprising
a polymer that is a crosslinkable polymer, and
diutan, wherein the diutan is not crosslinked by the crosslinking agent; and
introducing the treatment fluid into a well bore penetrating the subterranean formation.

20. The method of claim 19 wherein at least a portion of the molecules of the crosslinkable polymer are crosslinked by a reaction comprising the crosslinking agent.

21. The method of claim 19 wherein the biopolymer is present in the treatment fluid in a biopolymer-to-crosslinkable polymer ratio in the range of from about 0.05:1 to about 1:1.

22. The method of claim 19 wherein the biopolymer is present in the treatment fluid in a biopolymer-to-crosslinkable polymer ratio of about 0.1:1.

* * * * *